United States Patent
Yeh et al.

(10) Patent No.: US 8,300,266 B2
(45) Date of Patent: Oct. 30, 2012

(54) SYSTEM AND METHOD FOR ADJUSTING OPERATION OF PRINTHEADS IN AN INK PRINTING DEVICE

(75) Inventors: Andrew S. Yeh, Portland, OR (US); Bhaskar T. Ramakrishnan, Wilsonville, OR (US); Kelly D. Sims, Tualatin, OR (US); Katie Maria Teslow, Newberg, OR (US); Luo Cheng, Beaverton, OR (US); George Laurens Taylor, Tigard, OR (US); John Alan Durbin, Webster, NY (US); Ernest I. Esplin, Sheridan, OR (US); Howard A. Mizes, Pittsford, NY (US); Joel Chan, West Linn, OR (US); Ngoc-Diep Thi Nguyen, Portland, OR (US); Susan J. Zoltner, Newberg, OR (US); Yeqing Zhang, Penfield, NY (US); Lisa Schmidt, Sherwood, OR (US); Kenneth R. Chamberlain, Oregon City, OR (US); Matthew Hudson Dixon, Portland, OR (US); Steven Van Cleve Korol, Dundee, OR (US); James B. Campbell, Beaverton, OR (US); Russell J. Watt, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 902 days.

(21) Appl. No.: 12/402,557

(22) Filed: Mar. 12, 2009

(65) Prior Publication Data

US 2010/0232652 A1    Sep. 16, 2010

(51) Int. Cl.
*G06K 15/10* (2006.01)
*H04N 1/00* (2006.01)

(52) U.S. Cl. .............................. 358/1.8; 358/1.6; 358/1.9
(58) Field of Classification Search ........................ None
See application file for complete search history.

(56) References Cited

U.S. PATENT DOCUMENTS

| | | | |
|---|---|---|---|
| 6,736,478 B2 | 5/2004 | Franzke et al. | |
| 6,883,892 B2 | 4/2005 | Sievert et al. | |
| 7,073,883 B2 | 7/2006 | Billow | |
| 7,255,417 B2 | 8/2007 | Yamazaki et al. | |
| 7,367,646 B2 * | 5/2008 | Cordery et al. | 347/19 |
| 7,374,266 B2 | 5/2008 | Walmsley et al. | |
| 7,380,898 B2 | 6/2008 | Plante et al. | |
| 8,136,913 B2 * | 3/2012 | Yeh et al. | 347/19 |
| 2003/0210926 A1 | 11/2003 | Regimbal et al. | |
| 2005/0083364 A1 | 4/2005 | Billow | |
| 2009/0027433 A1 | 1/2009 | Van De Wynckel et al. | |

* cited by examiner

*Primary Examiner* — Dov Popovici
(74) *Attorney, Agent, or Firm* — Maginot, Moore & Beck, LLP

(57) ABSTRACT

A method evaluates image quality in an ink printing system and generates data values for altering the operation of the ink printing system. The method includes generating an ink image on an ink image receiving member that corresponds to a digital image stored in the ink printing system, generating a scanned image signal corresponding to the ink image, generating firing signal waveform adjustments and image data adjustments with reference to the scanned image signal corresponding to the ink image, and operating a printhead in an ink imaging system with reference to the firing signal waveform adjustments and the image data adjustments.

16 Claims, 13 Drawing Sheets

SYSTEM AND METHOD FOR ADJUSTING OPERATION OF PRINTHEADS IN AN INK PRINTING DEVICE

TECHNICAL FIELD

This disclosure relates generally to devices that generate ink images, and more particularly, for ink imaging devices that eject ink from a plurality of printheads to form an ink image.

BACKGROUND

Some ink printing devices use a single printhead, but many use a plurality of printheads. Multiple printheads may be arranged as shown in FIG. 13. As depicted there, printheads 18, 22, 26, and 30 are arranged in two rows and are staggered in those rows. By synchronizing the passage of an image receiving member with the firing of the inkjets in the printheads, a continuous ink image may be formed across the member in the direction perpendicular to the direction of member passage. Manufacturing tolerances result in variations between inkjets in a printhead and in variations between printheads. These variations include differences in the ink drop mass ejected by an inkjet, and the mean drop mass ejected by the inkjets in a printhead. Additionally, inkjets may respond differently to firing signals of the same frequency or amplitude. Calibration procedures may be used to produce more uniform results within a printhead and from printhead to printhead. Even after delivery of a printer, operation of the printer and the environmental conditions to which the printer is exposed eventual cause differences within printheads and between printheads to resurface. Currently, technicians using intricate procedures and external equipment are required to recalibrate the printer in the field. Consequently, providing printers with the capability of calibrating the image quality of a printer before delivery and during the life cycle of the printer is a desirable goal.

SUMMARY

A method evaluates image quality in an ink printing system and generates data values for altering the operation of the ink printing system. The method includes generating an ink image on an ink image receiving member that corresponds to a digital image stored in the ink printing system, generating a scanned image signal corresponding to the ink image, generating firing signal waveform adjustments and image data adjustments with reference to the scanned image signal corresponding to the ink image, and operating a printhead in an ink imaging system with reference to the firing signal waveform adjustments and the image data adjustments.

The method may be implemented with a system that generates test ink images and evaluates the test ink images to generate the data values for altering operation of the ink printing system. The system includes at least one printhead configured to eject ink onto an imaging receiving member to form an ink image that corresponds to a digital image stored in the ink printing system, a scanner configured to generate a scanned image signal corresponding to the ink image, an image evaluator configured to process the scanned image signal and generate firing signal waveform adjustments and image data adjustments; and a controller coupled to the at least one printhead and the image evaluator, the controller being configured to generate firing signals that operate the printhead to eject the ink, the controller generating the firing signals with reference to the firing signal waveform adjustments and the digital image.

BRIEF DESCRIPTION OF THE DRAWINGS

The foregoing aspects and other features of a system that evaluates image quality in an ink printing system and generates data values for altering the operation of the ink printing system are explained in the following description, taken in connection with the accompanying drawings.

DETAILED DESCRIPTION

Figure 1:
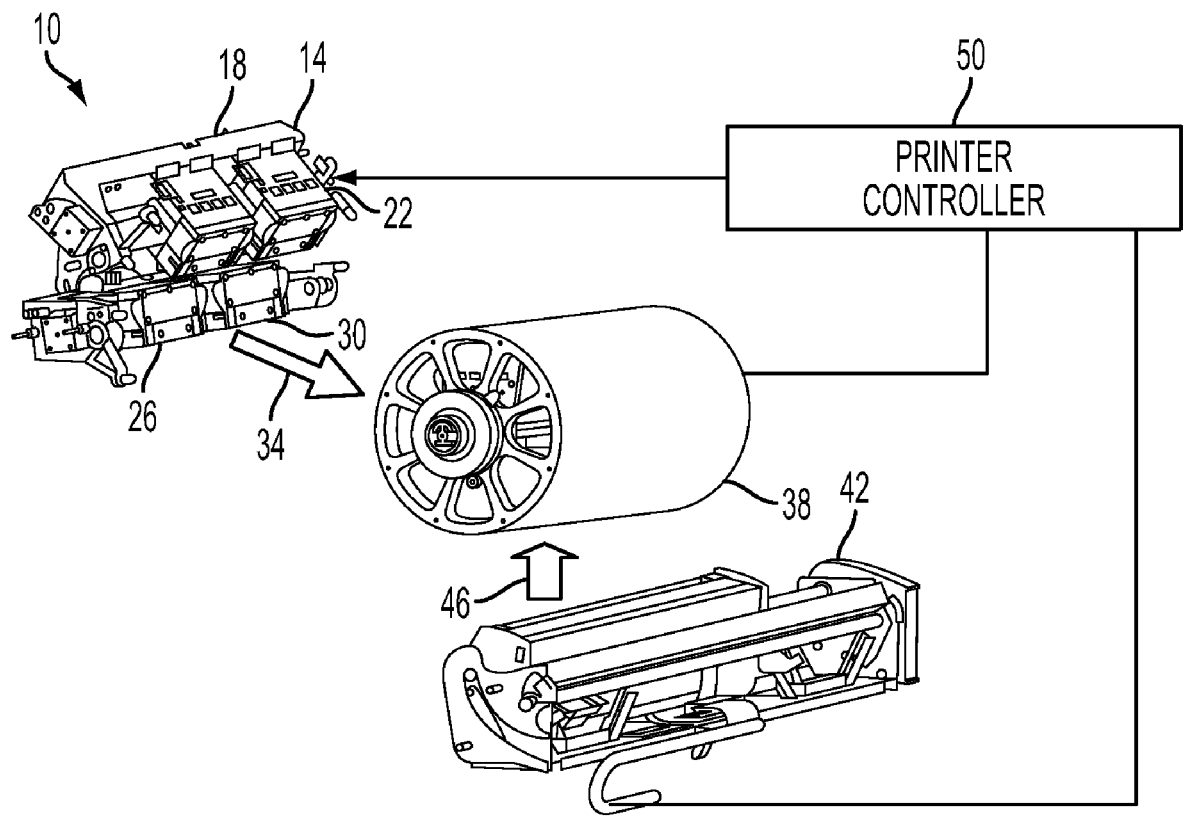
FIG. 1 is a block diagram of a printer depicting the components operated by a controller to generate images for evaluation and generate adjustments for firing signals and digital image corrections.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that performs a print outputting function for any purpose, such as a digital copier, bookmaking machine, facsimile machine, a multifunction machine, or the like. Also, the description presented below is directed to a system that generates firing signal waveform and voltage adjustments and digital image adjustments.

Figure 13:
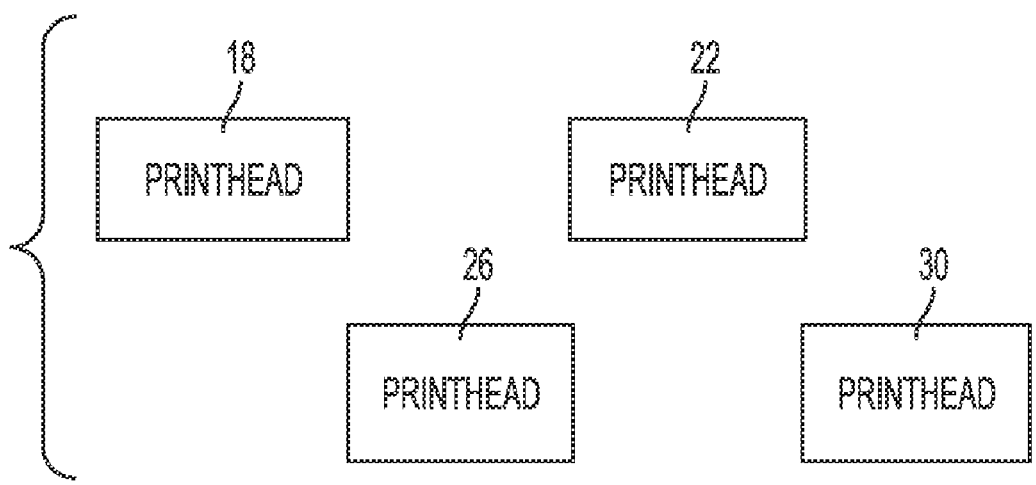
FIG. 13 is an illustration of a two row, staggered arrangement of four printheads in a prior art printer.

As shown in FIG. 1, a particular image generating system may be a printer. The printer 10 includes a printhead assembly 14, a rotating intermediate imaging member 38, a scanner 42, and a printer controller 50. The printhead assembly 14 includes four printheads 18, 22, 26, and 30. Typically, each of these printheads ejects ink, indicated by arrow 34, to form an image on the imaging member 38. The four printheads are arranged in a two by two matrix with the printheads in one row being staggered with reference to the printheads in the other row as shown in FIG. 13. Controlled firing of the inkjets in the printheads in synchronization with the rotation of the imaging member 38 enables the formation of single continuous horizontal bar across the length of the imaging member. The intermediate imaging member 38 may be a rotating drum, as shown in the figure, belt, or other substrate for receiving ink ejected from the printheads. Alternatively, the printheads may eject ink onto a substrate of media moving along a path adjacent to the printheads. The scanner 42 includes a light source for illuminating the imaging member 38 and a set of light sensors, each of which generates an electrical signal having an amplitude corresponding to the intensity of the reflected light received by a sensor.

The printer controller 50 includes memory storage for data and programmed instructions. The controller may be implemented with general or specialized programmable processors that execute programmed instructions. The instructions and data required to perform the programmed functions may be stored in memory associated with the processors or controllers. The processors, their memories, and interface circuitry configure the controllers to perform the processes, described more fully below, that enable the generation and analysis of printed test strips for the generation of firing signal waveform adjustments and digital image adjustments. These components may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits.

The controller 50 in FIG. 1 is coupled to the printhead assembly 14, the imaging member 38, and the scanner 42 to synchronize the operation of these subsystems. To generate an image, the controller renders a digital image in a memory and generates inkjet firing signals from the digital image. The firing signals are delivered to the printheads in the assembly 14 to cause the inkjets to eject ink selectively. The controller is also coupled to the imaging member 38 to control the rate and direction of rotation of the imaging member 38. Controller 50 also generates signals to activate the scanner for illumination of the imaging member 38 and generation of a scanned image signal that corresponds to the image on the member 38. The scanned image signal is received by the controller 50 for storage and processing.

To evaluate the quality of the images being generated in one embodiment, the controller 50 may execute programmed instructions that enable the printer to implement a plurality of processes for generating image quality adjustments. In general, these processes result in the generation of ink images, called test patterns, on the imaging member 38, and the processing of scanned image signals generated by the scanner 42 from the image on the drum. In some embodiments, the images may be formed on media sheets that are removed from the imaging system and provided to a scanning system for generation of the scanned image signal. This scanned image signal may be provided to the imaging system for analysis or to another system. The processing of the scanned image signal enables the generation of positional coordinates for each inkjet and correlation of the amount of ink on the substrate to printheads and inkjets within printheads. Variations of the amount of ink within the images are used to generate firing signal waveform adjustments to improve head-to-head and inkjet-to-inkjet uniformity. Variations of the amount of ink are also used to generate digital image adjustments, such as tonal reproduction curves (TRCs), which are used to adjust digital images before printing to achieve uniformity at all dither levels for printheads with varying jetting characteristics. In one embodiment, a plurality of processes implemented by a controller executing programmed instructions include a drop mass calibration, a firing signal waveform and voltage calibration, and a tonal reproduction curve (TRC) calibration. One implementation of these processes is now discussed below.

Figure 2:
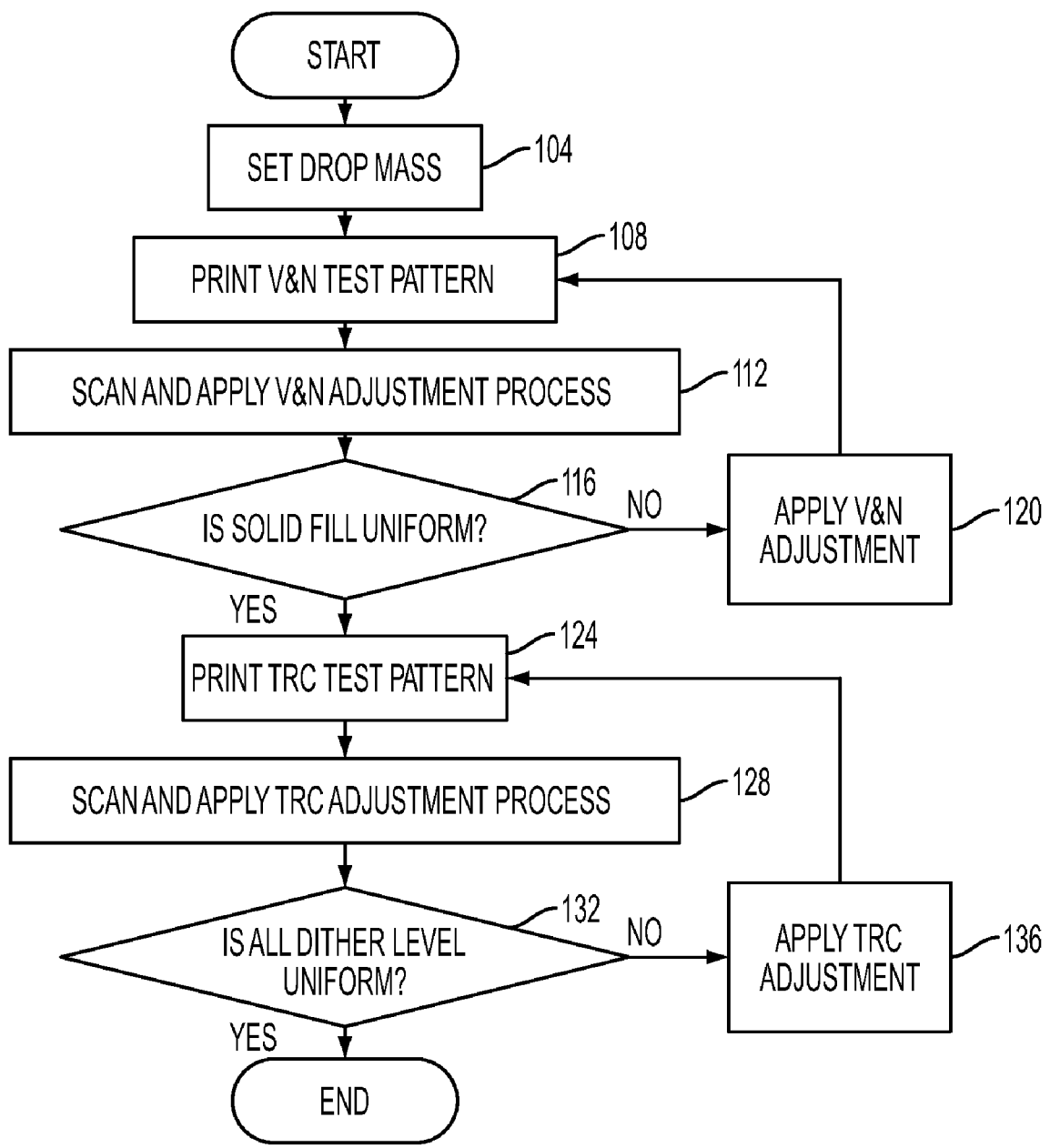
FIG. 2 is a flow diagram for a system that calibrates inkjets within printheads, uniformity between printheads, and image correction factors.

A process that may be implemented by a printer controller to calibrate a printer is shown in FIG. 2. The process begins by calibrating a drop mass (block 104), performing a firing signal waveform and voltage calibration (blocks 108, 112, 116, and 120), and a TRC calibration (blocks 124, 128, 132, and 136). The drop mass calibration controls the ink deposited at a 100% fill density, the firing signal calibration addresses printhead to printhead variation in solid fill areas, and the TRC calibration corrects inkjet to inkjet differences at different dither levels. The details of the calibrations are set forth below.

In the drop mass calibration (block 104), a test pattern is printed and the weight or intensity of the printed test pattern is measured. For example, a piece of media may be precisely weighed and fed into the printer. A test pattern is printed on the media and the media is then reweighed. The weight difference indicates a mass of ink deposited on the media. Dividing this mass by the number of drops fired onto the page gives an approximation of the ink mass ejected per drop for an inkjet in a printhead. The firing signal voltage for the intensity printed by the printhead may be altered to adjust the average drop mass per inkjet drop. The process may be iteratively performed until the measured drop mass is within a predetermined tolerance. In the intensity measurement, the test pattern may be printed on media or on a rotating imaging member within the printer, such as an image drum or belt. If the pattern is printed on media, the media may be scanned by an external scanner and the intensities of the light reflected by the test pattern measured by optical sensors. If the pattern is printed on an internal imaging member, the scanner may be located within the printer and the intensities measured within the printer. These intensities may be used to adjust the firing signal voltage until the measured intensities are within a tolerance indicative of a predetermined drop mass.

The solid fill uniformity calibration process includes three processes. These adjustments include a voltage adjustment process, a norm per color adjustment process, and a norm per inkjet adjustment process. The voltage adjustment process corrects the head to head mean intensity difference for each solid fill color printed by the printer. The second process adjusts norm per color to make head to head intensity uniform for each solid fill color. The third process adjusts norms for each inkjet to correct banding defects in the solid fill colors. Each of these processes is described below.

Figure 3A:
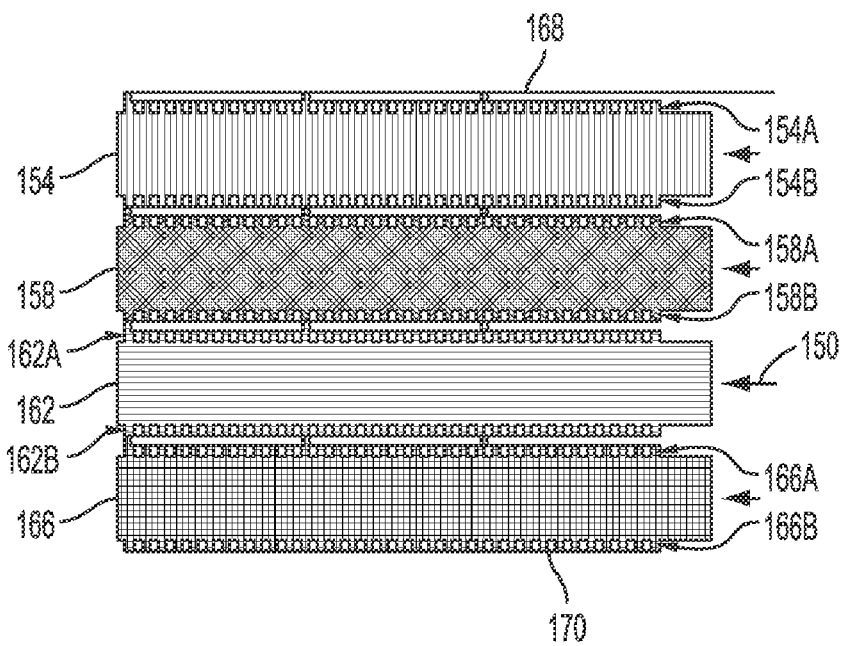
FIG. 3A is an illustration of four colored strips printed by printheads 18, 26, and 22 in FIG. 13.
Figure 3B:
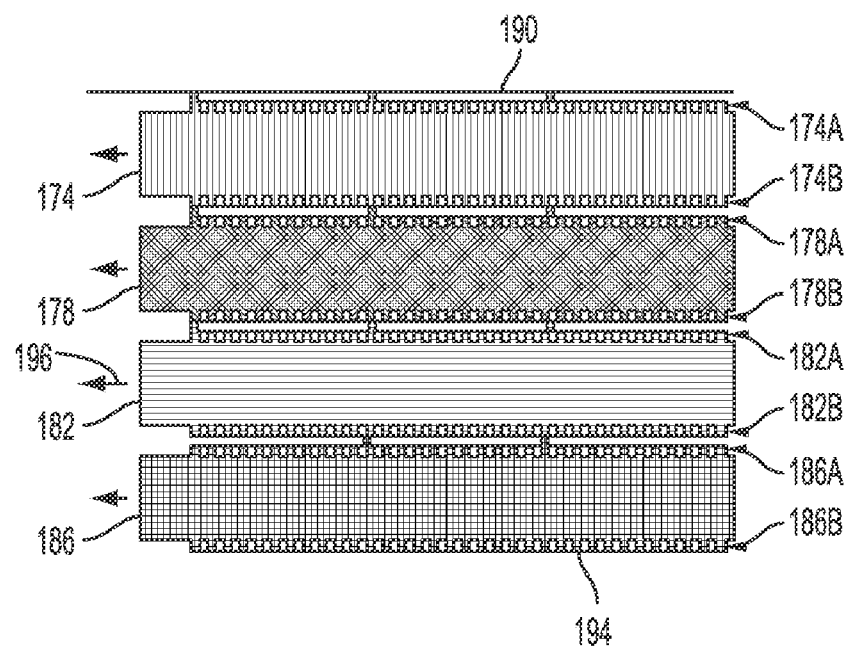
FIG. 3B is an illustration of four colored strips printed by printheads 26, 22, and 30 in FIG. 13.

The voltage adjustment process (FIG. 5), the norm adjustment process (FIG. 6), and the inkjet adjustment process (FIG. 7) begin with the printing of a solid fill test pattern. An example of a solid fill test pattern is shown in FIG. 3A and FIG. 3B. The test patterns in FIG. 3A include solid fill portions 154, 158, 162, and 166, one for each color of ink, fiducial marks 154A and 154B, 158A and 158B, 162A and 162B, and 166A and 166B, top horizontal line 168 and bottom horizontal line 170. Similarly, the test patterns in FIG. 3B include solid fill portions 174, 178, 182, and 186, one for each color of ink, fiducial marks 174A and 174B, 178A and 178B, 182A and 182B, and 186A and 186B, top horizontal line 190 and bottom horizontal line 194. The arrows 196 (FIG. 3B and FIG. 11B) and 150 (FIGS. 3A and 11A) indicate a scanning orientation for removable media. As described in more detail below, the horizontal lines are used for skew detection, the fiducial marks are used to identify the individual inkjets and regions of interest for analysis, and the solid fill areas are used to evaluate uniformity and intensities. Because the media may not be able to span the entire area across the four printheads configured in the arrangement shown in FIG. 13, the test pattern of FIG. 3A is printed with printheads 18, 26, and 22, while the test pattern of FIG. 3B is printed with printheads 26, 22, and 30 on a separate sheet of media.

Figure 4A:
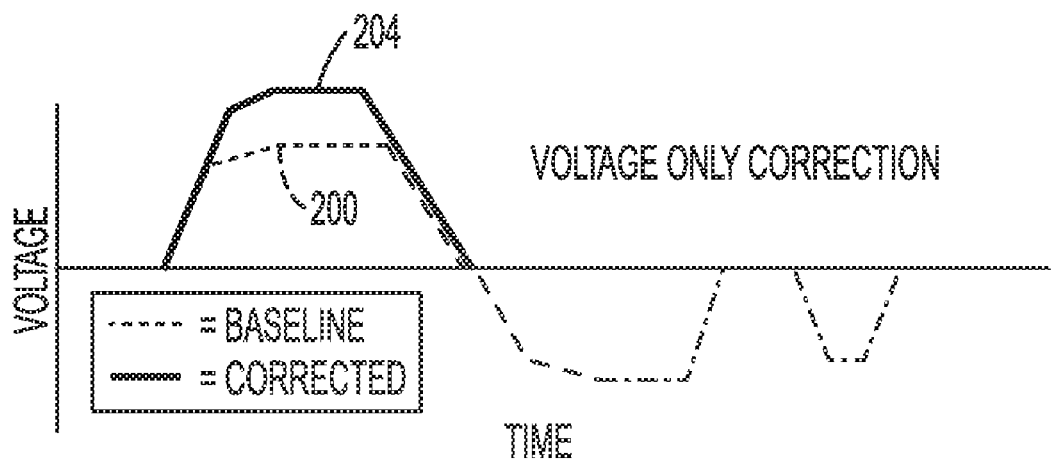
FIG. 4A is a graph depicting a voltage only adjustment to a firing signal.
Figure 4B:
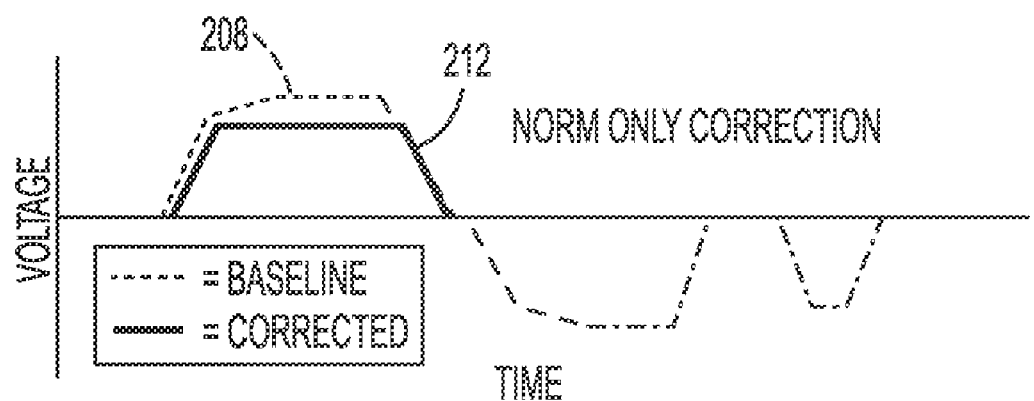
FIG. 4B is a graph depicting a normalization waveform adjustment to a firing signal.

The ink is ejected from the inkjet by exciting a piezoelectric actuator with a firing signal. The mass of ink may be adjusted by modifying the firing signal used to excite the piezoelectric actuator. The voltage and norm adjustment processes are used to calibrate different aspects of a firing signal as shown in FIG. 4A and FIG. 4B. In FIG. 4A, line 200 shows a baseline firing signal and line 204 depicts a modified firing signal after a voltage adjustment. In FIG. 4B, line 208 shows a baseline firing signal and line 212 depicts an adjusted firing signal after a norm adjustment.

Figure 5:
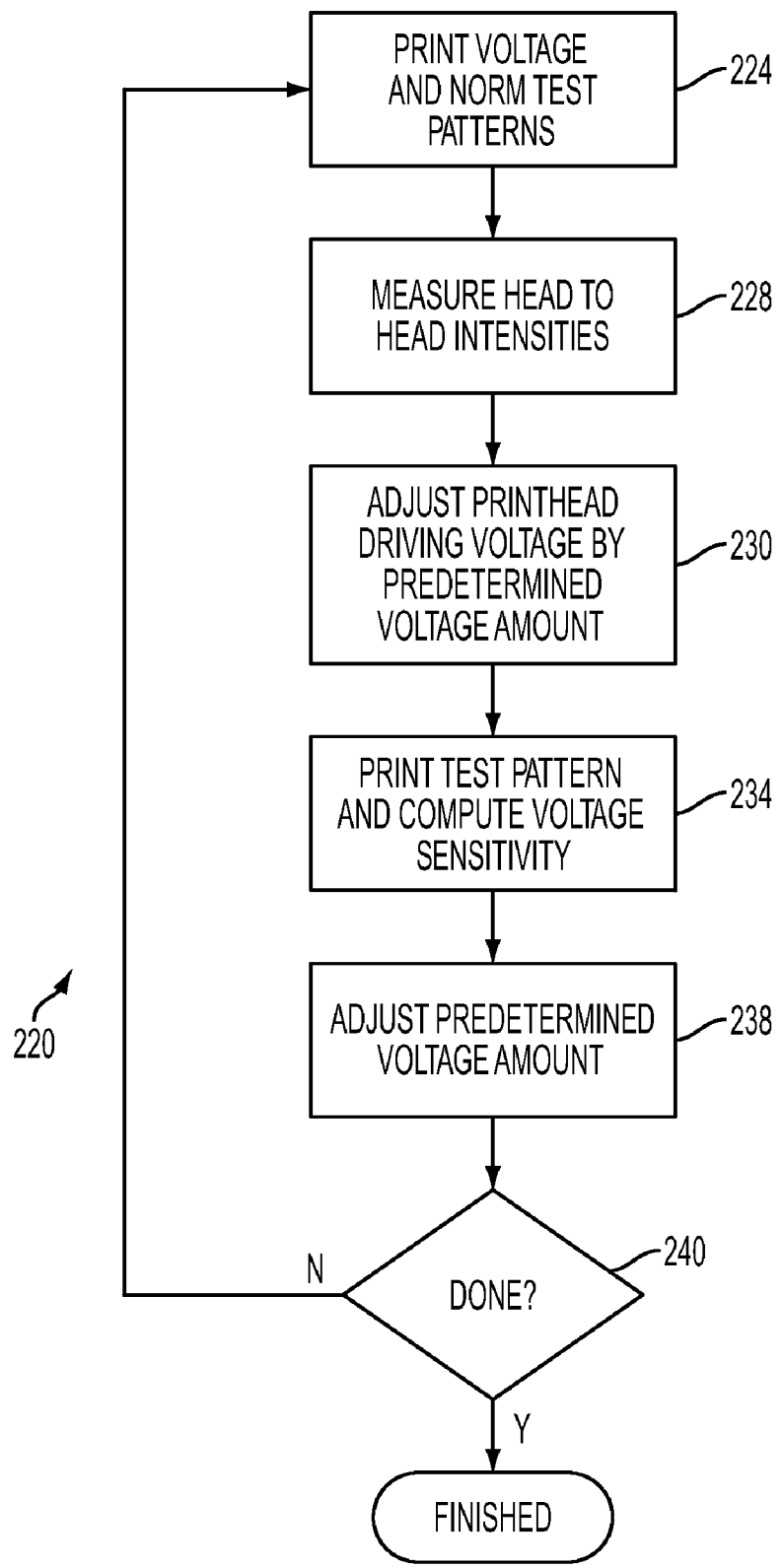
FIG. 5 is a flow diagram of a process for generating voltage adjustments for firing signals.

The voltage adjustment process 220 that processes the scanned image signal corresponding to the solid fill ink images and generates printhead waveform voltage adjustments in response to intensity values that differ from a range of predetermined solid fill intensity values is shown in FIG. 5. After a test pattern, such as the ones discussed above, have been printed (block 224), the average intensity of ink ejected from each head is measured (block 228). These intensities may be measured by an external scanner or an internal optical sensor array. For each printhead, the average of the intensity of all four colors may be used as a reference, or an individual color may be used as a reference. Also, one individual head may be chosen as a reference that the intensity of the other printheads must achieve, or the average intensity of all the printheads may be chosen as a reference. The baseline printhead driving voltage is then adjusted by a predetermined voltage amount in a direction detected from the measured intensities (block 230). For example, if one printhead is detected as ejecting less ink than another printhead from the measured intensities, then the baseline for the firing signals at the solid fill level may be increased by one volt. After the voltage adjustment, the test pattern is printed again, the intensities measured, and the voltage sensitivities measured (block 234). The voltage sensitivity is determined with reference to the change in measured intensity following the voltage adjustment. The relative differences between printhead intensities are correlated to a corresponding computed voltage sensitivity to adjust the predetermined voltage amount for another voltage adjustment to achieve a uniform intensity between heads (block 238). If the relative printhead to printhead intensity differences are within a predetermined tolerance (block 240), the process is finished. Otherwise, the process is iteratively performed until the differences are within the predetermined tolerance.

Figure 6:
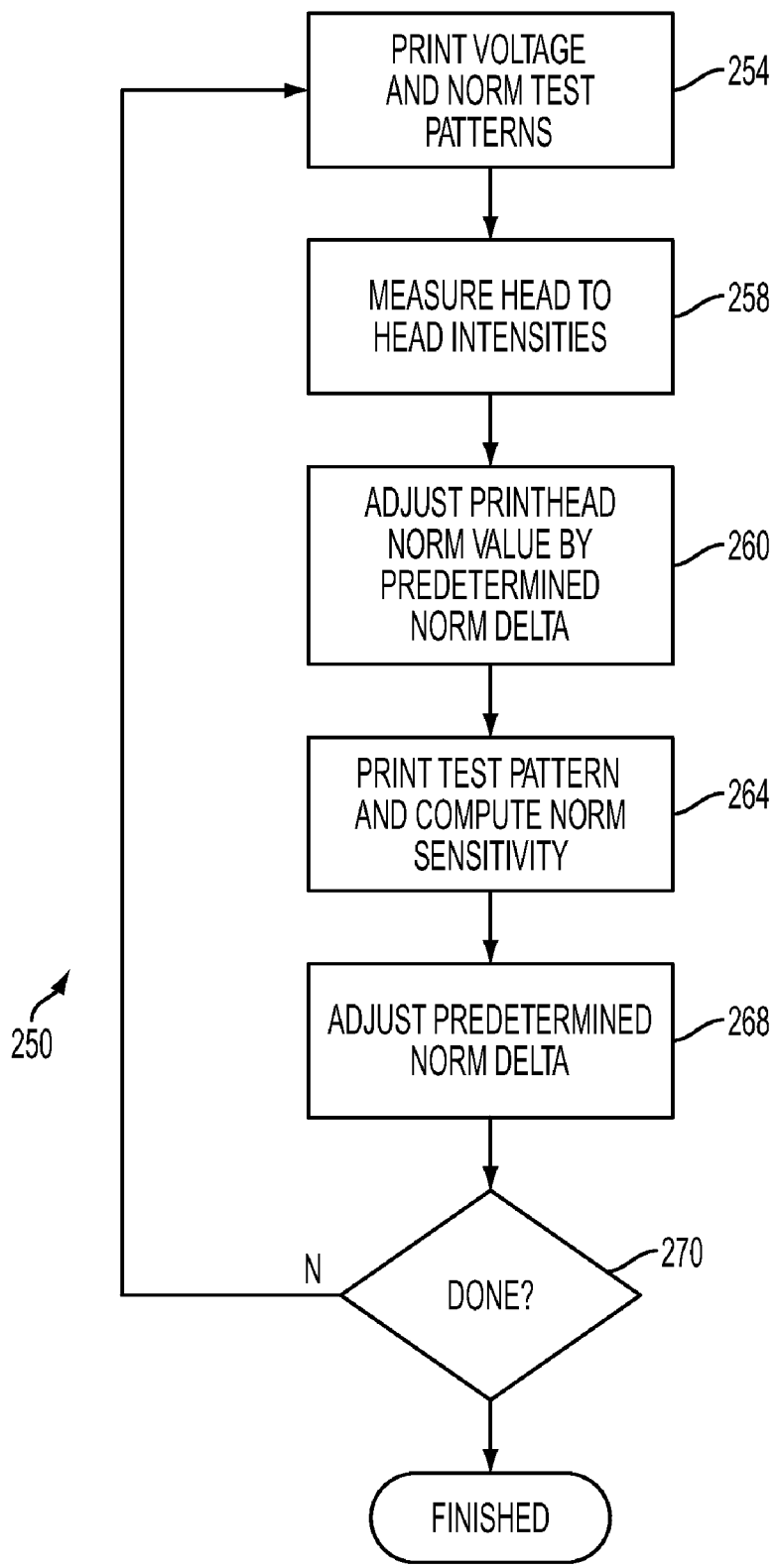
FIG. 6 is a flow diagram of a process for generating normalization waveform adjustments to firing signals.

The norm adjustment process 250 that processes the scanned image signal corresponding to the solid fill ink images and generates printhead waveform normalization adjustments in response to intensity values in the scanned image signal failing to correspond to a range of predetermined solid fill intensity values is shown in FIG. 6. After a test pattern, such as the ones discussed above, have been printed (block 254), the head to head intensities are measured (block 258) for each individual color. Again, these intensities may be measured by an external scanner or an internal optical sensor array. The baseline printhead norm signal for a color is then adjusted by a predetermined norm amount in a direction detected from the measured intensities (block 260). For example, if one printhead is detected as ejecting less ink of a particular color than another printhead as may be detected from the measured intensities, then the firing waveform for all jets of that particular color are modified as shown in FIG. 4B to cause that color to eject more ink. Norm click is a term that quantifies the change in the firing voltage profile between line 208 and line 212 in FIG. 4B. If the norm click is increased, the first pulse rises to larger value. If the norm click is decreased, the first pulse rises to a smaller value. In the first adjustment, the norm click may be adjusted by four units. After the norm adjustment, the test pattern is printed again, the intensities measured, and the norm sensitivities measured (block 264). The norm sensitivity is determined with reference to the change in measured intensity following the norm adjustment. The relative differences between printhead intensities for each color are correlated to a corresponding computed norm sensitivity to adjust the predetermined norm amount for another norm adjustment (block 268). If the relative printhead intensity differences for each color are within a predetermined tolerance (block 270), the process is finished. Otherwise, the process is iteratively performed until the differences are within the predetermined tolerance.

Figure 7:
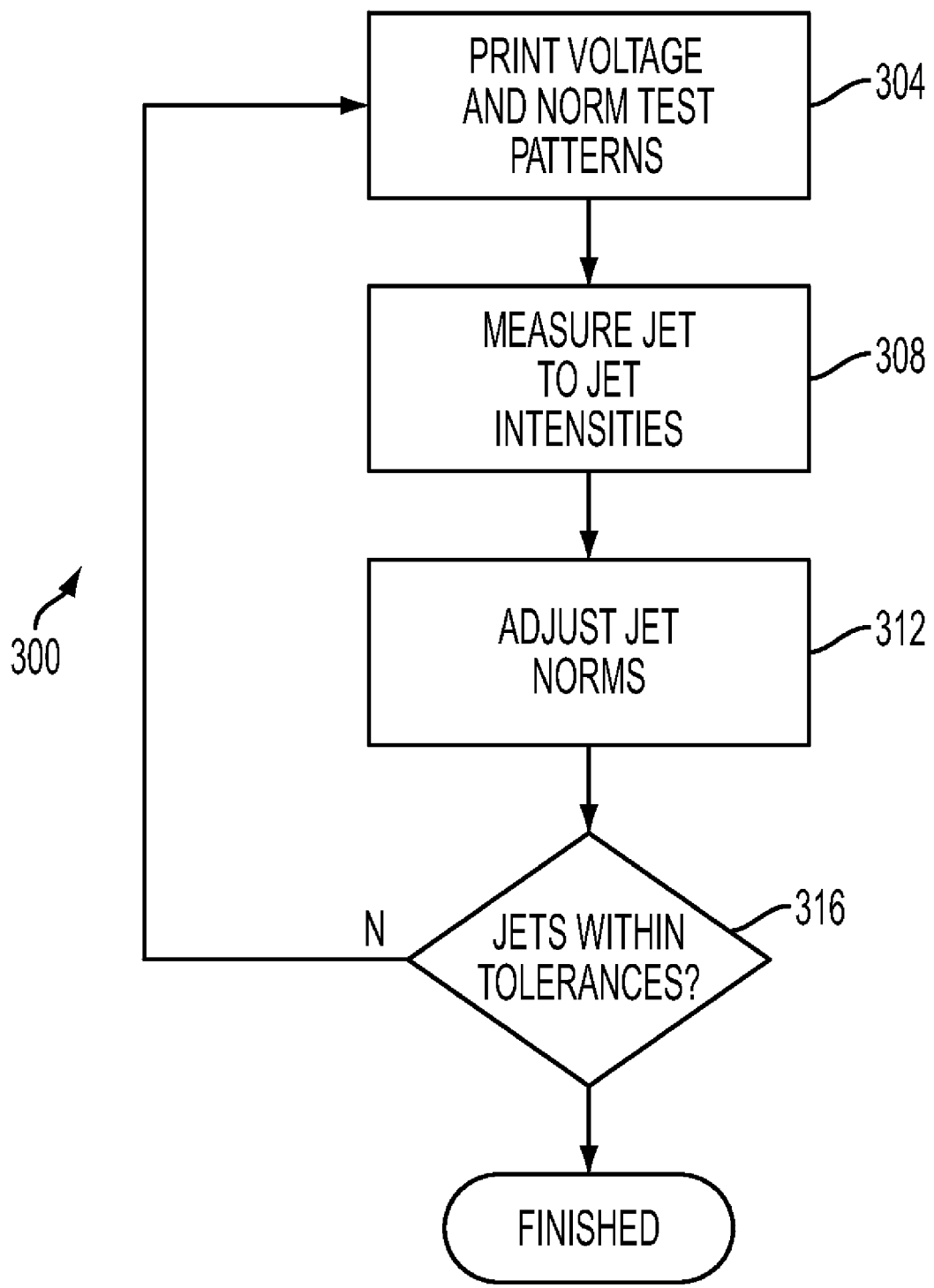
FIG. 7 is a flow diagram of a process for generating firing signal adjustments for inkjets within a printhead.

The individual inkjet adjustment process 300 that processes the scanned image signal corresponding to the solid fill ink images and generates inkjet waveform voltage adjustments in response to intensity values in the scanned image signal failing to be uniform on the length scale of a single jet across all printheads is shown in FIG. 7. After a test pattern, such as the ones discussed above, have been printed (block 304), the inkjet to inkjet intensities are measured (block 308). Again, these intensities may be measured by an external scanner or an internal optical sensor array. Individual inkjet norms are then adjusted (block 312). In one embodiment, the measured uniformity profile across all jets on all printheads is smoothed using dual length scale evaluation. Dual length scale evaluation simultaneously addresses the problems of a limited range of control, and a marginal or poor signal to noise ratio in the measurement of an inkjet. Using a measured intensity profile as a function of inkjet position, the smoothing process calculates a signal curve and a target curve. Each inkjet norm is then adjusted to attain the target curve. The target curve is a smoothed intensity profile in which each point is replaced by the average of the intensities of the inkjets within a distance x or the average of the intensities of all the inkjets. In one embodiment, the distance x is chosen to enable a slow variation in the target intensity profile that is acceptable to a human eye at normal viewing distances. The average control range increases as the distance x decreases. The signal curve is calculated using a smoothed intensity profile with a distance y in which y<x. If the signal to noise ratio of a single inkjet measurement is acceptable, then the signal curve is simple and equals the measured intensity profile, that is, y=0. If not, the distance y is set in the range of 0<y<x so that the measurement of the average intensity of the jets in the extended area defined by x has an adequate signal to noise ratio. Thus, individual inkjets may then be adjusted to the target curve based on the signal curve in the presence of measurement noise. The norms may be iteratively adjusted until the inkjets are within a predetermined tolerance (block 316).

In each of the processes described above with reference to FIG. 5, FIG. 6, and FIG. 7, the printed test pattern is processed to identify coordinate information in the scanned area before any adjustments are made. In one embodiment, the scanned image is transferred to the printer controller for analysis in two portions to conserve memory. The first portion is approximately ⅝ of the whole image and the second portion is also approximately ⅝ of the image that includes the approximately ⅜ image portion not contained in the first portion. In embodiments where memory need not be conserved, the entire image may be obtained in a single image acquisition.

Figure 8:
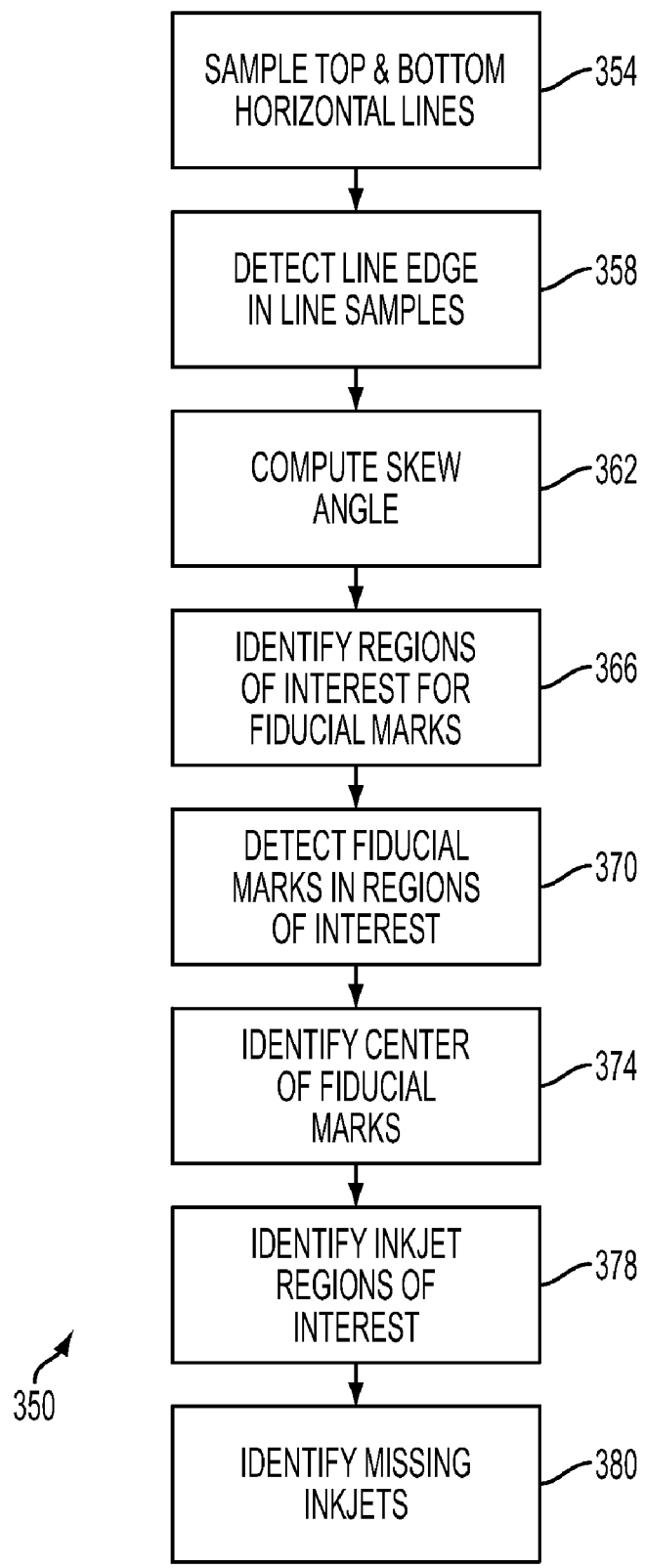
FIG. 8 is a flow diagram of a process for identifying positional coordinates, regions of interests, and fiducials within the colored strips of FIG. 3A and FIG. 3B.
Figure 9:
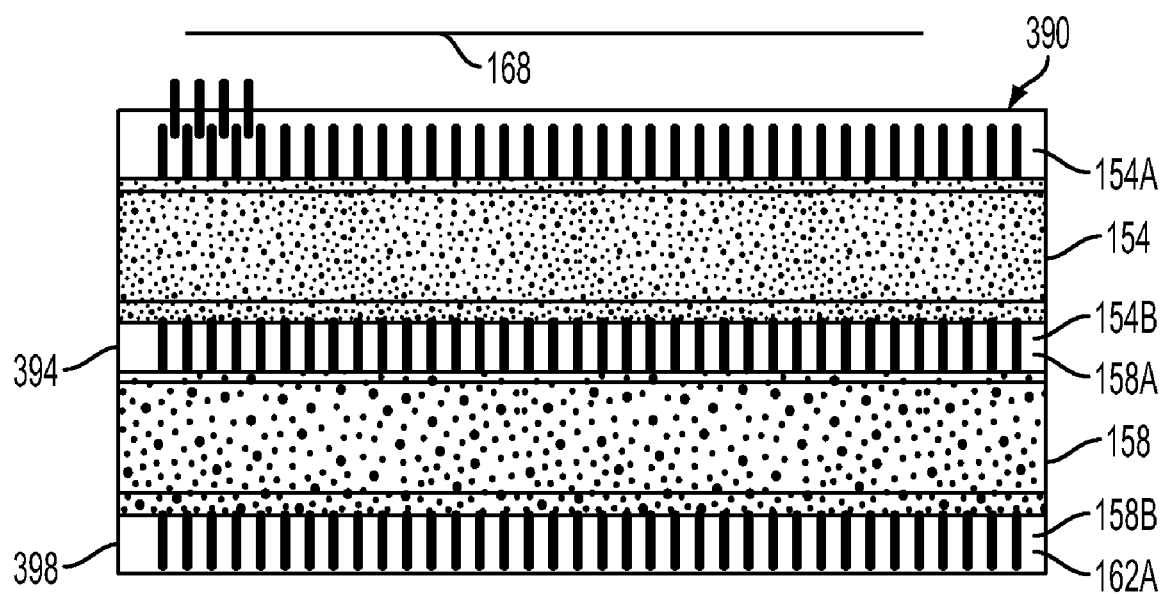
FIG. 9 is a portion of a test strip pattern identifying the line used for skew detection, the regions of interest in the pattern, and the fiducials.
Figure 10:
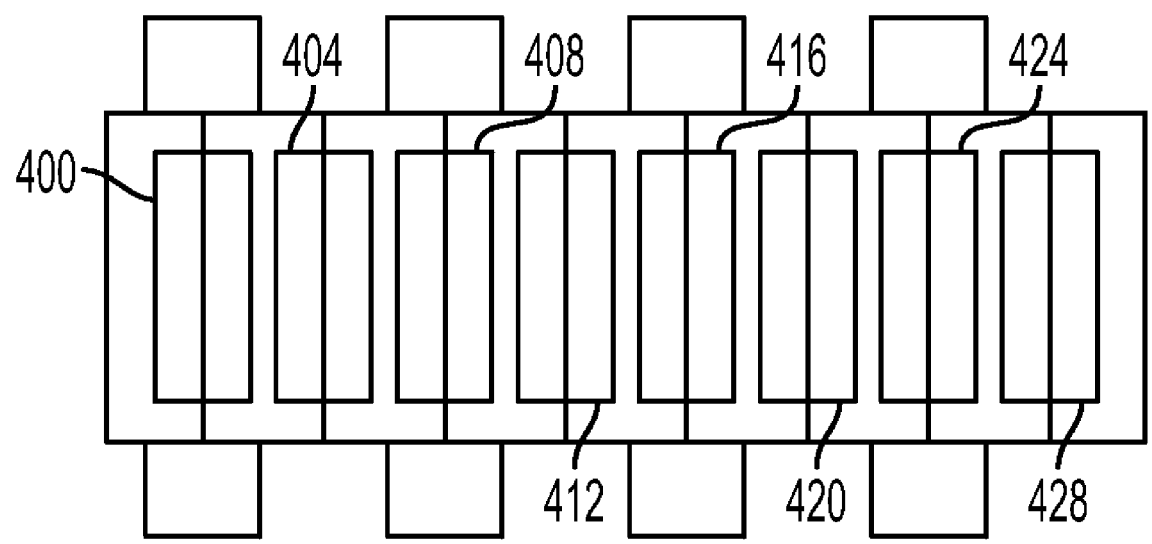
FIG. 10 is diagram indicating regions of interest used to identify inkjet locations in a fiducial pattern.

The coordinate processing is now described with reference to FIG. 8. The process begins with the sampling of the top and bottom horizontal lines. A predetermined number of regions of interest in one horizontal line are sampled (block 354) and the line edge in the samples is detected (block 358). The skew angle is then calculated from the detected line edge (block 362). In one embodiment, the skew angle is calculated by applying a line fitting method to the detected edge data points. In a similar manner, a skew angle is detected for the other horizontal line. Using the detected line location and the identified skew angle, fiducial regions of interest and reference points for fiducial marks along with solid fill strip regions of interest may be identified. Then the fiducial mark height and solid fill area height may be used to identify the regions of interest for the fiducial marks (block 366). In the illustration depicted in FIG. 9, the top horizontal line 168 is used for line edge detection and skew angle computation. The fiducial regions of interest 390, 394, and 398 for the fiducial marks 154A, 154B, 158A, 158B, and 162A are identified using the height of the fiducial marks and the height of the solid fill strips. The strip regions of interest for the solid fill strips are identified as the areas between the regions of interest for the fiducial marks. Once the regions of interest for the fiducial marks are identified, the fiducial marks are detected (block 370) and their centers are identified (block 374). Regions of interest for each inkjet may then be identified (block 378) and the intensities in those regions of interest processed to identify the average intensity of ink jetted from each inkjet. Those inkjets that are not ejecting ink or ejecting ink at an inappropriately low mass or reliability can be detected from this measurement (block 380). The identity of the missing inkjets is used for TRC calibration as described below. In FIG. 10, regions of interest 400, 404, 408, 412, 416, 420, 424, and 428 are depicted with a corresponding center line at which intensities are sampled for missing inkjet detection.

In one embodiment, fiducial marks in a region of interest may be detected using a method in which intensities in a scan line are convolved with a matched filter and a null filter. The matched filter has the same period as the fiducials so the convolution of a scan line intensity profile with a matched filter produces two oscillating signals that are ninety degrees out of phase. The sum of the squares of a scan line intensity profile provides a measure of the fiducial signal power. The null filter has a period that is twice that of the matched filter. The length of the null filter is the length of two fiducials and the contribution of one fiducial should cancel the contribution of the other fiducial. The convolution of a scan line intensity profile in a fiducial region of interest should result in a zero signal in the absence of a fiducial within the region of interest. A threshold for the matched filter is chosen so that the presence of the periodic pattern of fiducials exceeds the threshold, but the profile of a non-periodic pattern through a solid strip is below the threshold. A threshold for the null filter is chosen so that the periodic signal from the fiducials is below the threshold. The thresholds may be determined in a training process from a set of printers representing the printer population. To locate the center of the detected fiducial, the scan line intensity profile in the region of interest is convolved with a low pass filter to round the minimum points and a curve fitting is performed using a second order polynomial to interpolate the center of the fiducial between intensity points in the profile. The center is the point where the derivative of the polynomial equals zero.

Following identification of the fiducial centers for the fiducial above and below a solid fill strip, the regions of interest for inkjets may be identified (FIG. 10). If the width of the region of interest is too large, then cross talk may exist in the measured signal between neighboring jets. If the width of the region of interest is too small, then the noise of the measured signal increases. The size of the inkjet regions of interest is adjusted to make the best tradeoff between the measurement and neighboring inkjet crosstalk. Because the center of a fiducial may not be aligned exactly with the pixel grid of the scanned image, gray level interpolation is implemented to improve the accuracy of the inkjet intensity profile. The missing inkjet detection noted above may be based on a standard deviation of the inkjet intensity profile and a predetermined grayscale value. In one embodiment, the predetermined value is twelve grayscale levels; however, if the four a value for an intensity profile is greater than the predetermined grayscale value, then the predetermined grayscale value is set to the mean average of the profile plus the predetermined grayscale value. For example, in the embodiment using the twelve grayscale level predetermined value, the threshold would become the mean average of the profile plus twelve grayscale units. If an intensity is greater than the threshold, the inkjet is classified as being missing and the measured intensity is replaced with the mean average of a few neighboring inkjets.

As noted above, a first test pattern is generated with a subset of the printheads and then another test pattern is generated with another subset of printheads. To generate an intensity profile that crosses this boundary, the intensities in the first test pattern generated by the printheads common to both subsets are mean averaged with the intensities in the second test pattern generated by those printheads. Alternatively, the intensities for the common printheads in one test pattern may be replaced with the intensities generated in the other test pattern.

The TRC calibration addresses an issue arising from the changing piezoelectric actuator efficiency. TRCs may be implemented as lookup tables stored within a printer to modify the input digital gray level for each printhead differently to compensate for variations between printheads at a printed intensity as a function of dither level. The inkjet TRCs minimize the printhead to printhead intensity differences at all dither levels. Image data adjustments to a TRC may be obtained in response to manual selection of a TRC calibration or in accordance with a predetermined schedule.

Figure 11A:
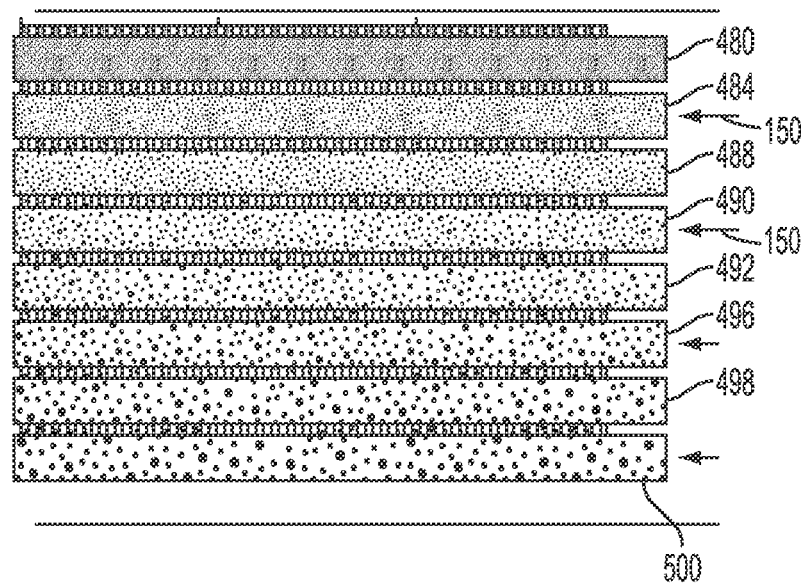
FIG. 11A is an illustration of an eight strip dithered pattern of a single color printed by printheads 18, 26, and 22 in FIG. 13 that are used to generate digital image adjustments.
Figure 11B:
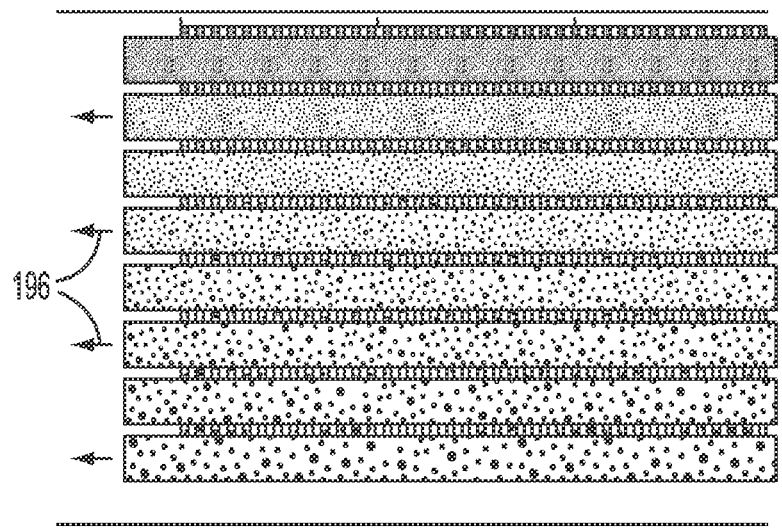
FIG. 11B is an illustration of an eight strip dithered pattern of a single color printed by printheads 22, 26, and 30 in FIG. 13 that are used to generate digital image adjustments.
Figure 12:
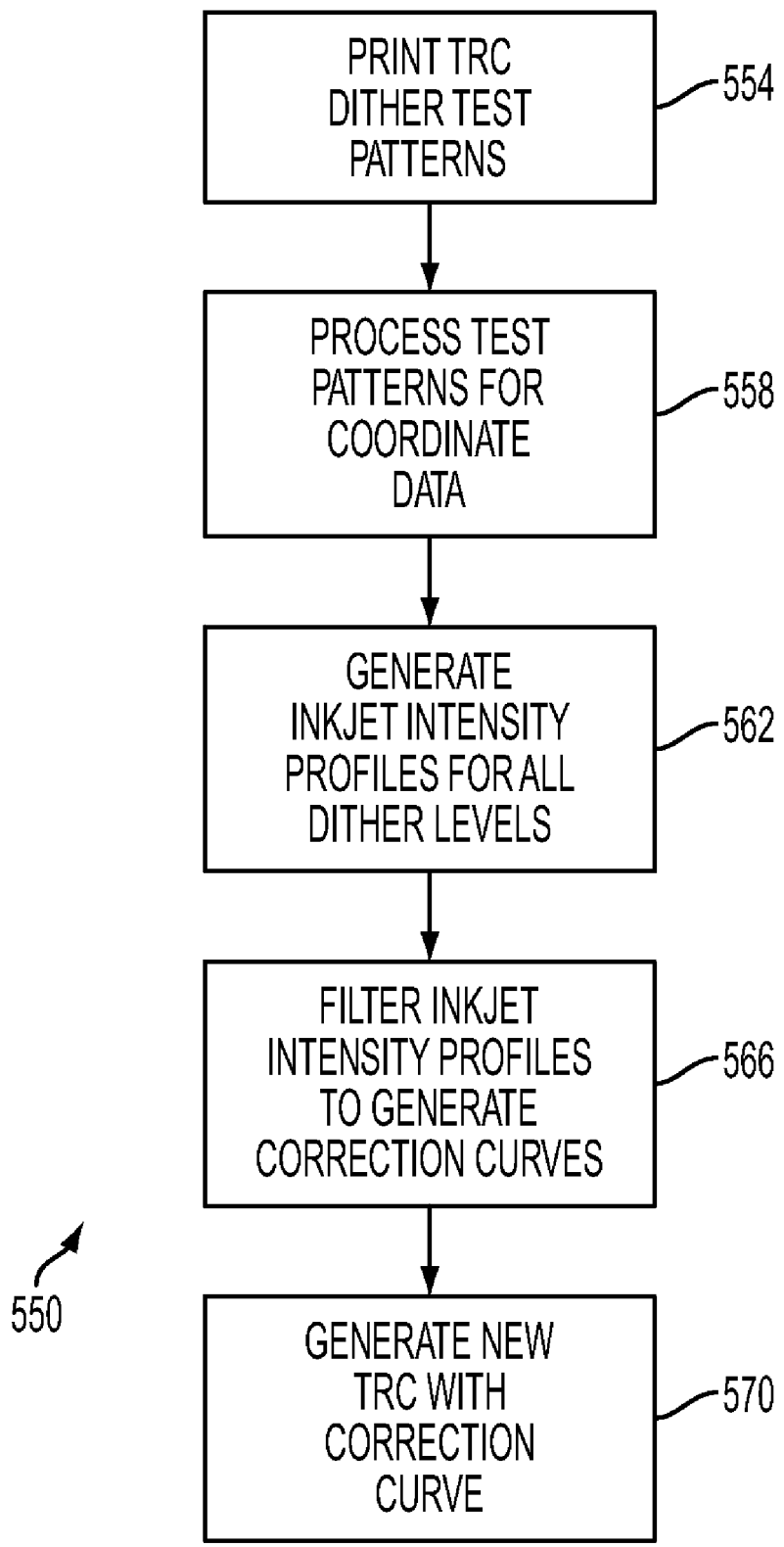
FIG. 12 is a flow diagram of a process for calibrating TRCs in a printer using the test patterns of FIG. 11A and FIG. 11B.

A process for identifying image data adjustments used to calibrate TRCs is shown in FIG. 12. The process 550 begins by printing the TRC dither test patterns (block 554). An example of these test patterns is shown in FIG. 11A and FIG. 11B. FIG. 11A and FIG. 11B are generated by different subsets of the printheads as discussed above with reference to FIG. 3A and FIG. 3B. To simplify the discussion of the test pattern only the pattern shown in FIG. 11A is discussed. The strips 480, 484, 488, 490, 492, 496, 498, and 500 are each printed at a different fill level. In one embodiment, strip 500 is printed at a 12.5% fill level, strip 498 is printed at a 25% fill level, strip 496 is printed at a 37.5% fill level, strip 492 is printed at a 50% fill level, strip 490 is printed at a 62.5% fill level, strip 488 is printed at a 75% fill level, strip 484 is printed at a 87.5% fill level, and strip 480 is printed at a 100% fill level. Also as discussed above with reference to FIG. 3A and FIG. 3B, each strip is printed with an upper and a lower fiducial mark and a top horizontal line and bottom horizontal line are also included for skew angle identification.

After the test patterns are generated, the coordinate data are identified (block 558, FIG. 12) as discussed above with reference to FIG. 8. Then the remainder of the process shown in FIG. 12 includes the generation of the individual inkjet intensity profiles (block 562) in a manner similar to that discussed above. The generation of these profiles may include the stitching discussed above to enable the inkjet profiles to extend across both sets of test patterns generated. The inkjet intensity profiles are then filtered to reduce noise and to generate the TRC correction curves (block 566). The correction curves are then used to generate new TRCs for the dithered levels of the color produced in the test patterns (block 570). The procedure is then repeated for the other colors.

In one embodiment singular value decomposition (SVD) is used to filter the intensity profiles. SVD filtering is performed in two dimensional space and filters a profile with reference to neighboring jets as well as the inkjet of interest in the direction of the dithering levels. SVD filtering is performed with a rectangular matrix A, which is a decomposition of the form $A=USV^t$, where U and V are orthogonal matrices and S is a diagonal matrix. Filtering is achieved by setting one of the significant components in U to zero and reconstructing back to A in a known manner. In TRC generation, intensity variation between inkjets is more important than mean intensity. Therefore, the A matrix is formed by subtracting each inkjet intensity value from its mean average intensity. After decomposition, three basis vectors are used to reconstruct back to the filtered intensity profile, although fewer basis vectors may be used to increase filtering. Based on the intensity and TRC relationship, desired mean TRC curves can be derived from mean intensities from the dither levels measured. Because higher intensity means less ink on prints, therefore, an individual TRC for each inkjet can be constructed by adding a SVD filtered intensity profile signal to a desired mean TRC. Similarly, the SVD technique can be applied again to filter an individual TRC to achieve a desired signal/noise level. Finally, a full dither level TRC can be interpolated from eight measured dither level TRCs.

In operation, the controller of an imaging system is configured with programmed instructions for implementing the firing signal waveform adjustment and image data adjustment processes. During the life of the imaging system, the controller selects and operates the calibration processes in accordance with a schedule or as they are activated manually. The processes scheduled for selection and operation at a particular time are selected in accordance with the predetermined sequence. The waveform adjustment values are stored in a memory within the printer and used by the printhead controller to generate firing signals for the inkjets in a printhead. Similarly, the image data adjustments values are used to adjust TRCs stored in the printer. These adjusted TRCs are then used to dither digital images before the image is used to generate firing signals.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A system for evaluating image quality in an ink printing system comprising:
at least one printhead configured to eject ink onto an image receiving member to form an ink image that corresponds to a digital image stored in the ink printing system;
a scanner configured to generate a scanned image signal corresponding to the ink image;
a controller coupled to the at least one printhead, the controller being configured to generate firing signals that operate the printhead to eject the ink and form solid fill ink images on the image receiving member in response to a waveform adjustment test selection; and
an image evaluator coupled to the controller, the image evaluator being configured to process the scanned image signal corresponding to the solid fill ink images and to generate firing signal waveform adjustments and image data adjustments, the firing signal waveform adjustments including printhead waveform voltage adjustments generated in response to intensity values in the scanned image signal being outside a range of predetermined solid fill intensity values, and the controller generates the firing signals with reference to the firing signal waveform adjustments and the image data adjustments generated by the image evaluator.

2. The system of claim 1 wherein the ink printing system receives the digital image from the image evaluator.

3. The system of claim 1 wherein the controller is further configured to generate the firing signals to eject ink and form dithered ink images on the image receiving member in response to the waveform adjustment test selection.

4. The system of claim 3 wherein the controller is configured to generate at least one dithered ink image, each generated dithered ink image having a different dithered level.

5. The system of claim 1 wherein the image evaluator processes the scanned image signal corresponding to the solid fill ink images and generates inkjet waveform normalization adjustments in response to intensity values being outside a range of predetermined solid fill intensity values.

6. The system of claim 1 wherein the image evaluator processes the scanned image signal corresponding to the solid fill ink images and generates inkjet waveform normalization voltage adjustments in response to a dual length scale evaluation indicating intensity values are not uniform.

7. The system of claim 1 wherein the image evaluator processes the scanned image signal corresponding to the solid fill ink images to detect skew, identify at least one region of interest, and identify a center of a fiducial in each identified region of interest.

8. The system of claim 1 wherein the scanner is external of an imaging system in which the printhead is located; and
the image evaluator receives and processes the scanned image signal generated by the scanner.

9. A method for evaluating image quality in an ink printing system comprising:
generating an ink image on an ink image receiving member that corresponds to a digital image stored in the ink printing system;
generating a scanned image signal corresponding to the ink image;
processing the scanned image signal to identify an intensity for each inkjet in a printhead;
detecting skew in the scanned image signal;
identifying a fiducial region of interest in the scanned image signal;
identifying a strip region of interest in the scanned image signal;

generating firing signal waveform adjustments and image data adjustments with reference to the scanned image signal corresponding to the ink image; and operating the printhead in the ink printing system with reference to the firing signal waveform adjustments and the image data adjustments.

10. The method of claim 9, the ink image generation further comprising:

generating solid fill ink images on the ink image receiving member to enable generation of the firing signal waveform adjustments; and generating dithered ink images on the ink image receiving member to enable generation of the image data adjustments.

11. The method of claim 10, the generation of the dithered ink images further comprising:

generating at least one dithered ink image on the ink image receiving member, each dithered ink image having an intensity level different than another dithered ink image.

12. The method of claim 9, the fiducial region of interest identification further comprising:

identifying a fiducial in the identified fiducial region of interest; and identifying a center of the fiducial.

13. The method of claim 12 further comprising:

identifying an inkjet position with reference to the fiducial center.

14. The method of claim 9, the generation of the waveform adjustments further comprising:

generating printhead voltage adjustments with reference to the scanned image signal;

generating inkjet normalization adjustments with reference to the scanned image signal.

15. The method of claim 9, the generation of the image data adjustments further comprising:

modifying values in a tonal reproduction curve stored in the ink printing system.

16. The method of claim 9, the operation of the printhead with reference to the waveform adjustments and the image data adjustments further comprising:

modifying digital image data with the image data adjustments;

generating firing signals for the printhead with reference to the waveform adjustments and the modified digital image data.

* * * * *